United States Patent
Krummrich

(10) Patent No.: US 6,795,236 B2
(45) Date of Patent: Sep. 21, 2004

(54) CASCADABLE OPTICAL AMPLIFIER ARRANGEMENT

(75) Inventor: Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 09/934,308

(22) Filed: Aug. 20, 2001

(65) Prior Publication Data

US 2002/0041435 A1 Apr. 11, 2002

(30) Foreign Application Priority Data

Aug. 18, 2000 (DE) .......................... 100 40 446

(51) Int. Cl.⁷ ............................................... H01S 3/00
(52) U.S. Cl. .................................................. 359/337.4
(58) Field of Search ...................... 359/337.4, 333–349

(56) References Cited

U.S. PATENT DOCUMENTS

| | | | | |
|---|---|---|---|---|
| 6,236,498 B1 | * | 5/2001 | Freeman et al. | 359/337.1 |
| 6,411,407 B1 | * | 6/2002 | Maxham | 398/173 |
| 6,411,414 B1 | * | 6/2002 | Abate et al. | 398/182 |
| 6,437,906 B1 | * | 8/2002 | Di Pasquale et al. | 359/337.2 |
| 6,452,722 B1 | * | 9/2002 | Krummrich et al. | 359/341.41 |
| 6,556,340 B1 | * | 4/2003 | Wysocki et al. | 359/334 |
| 6,603,596 B2 | * | 8/2003 | Inagaki et al. | 359/341.4 |

FOREIGN PATENT DOCUMENTS

WO  WO 99/43117  8/1999  ............ H04J/14/00

OTHER PUBLICATIONS

Jacobovitz, et al., "A 5.5–W Single–Stage Single–Pumped Erbium Doped Fiber Amplifier at 1550 nm", Optical Amplifiers and Their Applications; Postdeadline Papers 1997, Jul. 21–23, 1997, Victoria, BC, Canada, PD3–1–PD3–4.

Park, et al., "Dynamic Gain and Output Power Control in a Gain–Flattened Erbium–Doped Fiber Amplifer", IEEE Photonics Technology Letters, vol. 10, No. 6, Jun. 1998, pp. 787–789.

Tashiro, et al., "1.5 W Erbium Doped Fiber Amplifier Pumped by the Wavelength Division–Multiplexed 1480 nm Laser Diodes with Fiber Bragg Grating", Optical Amplifiers and Their Applications, Technical Digest, Jul. 27–29, 1998, Vail, Colorado, pp. 213–215.

Park, et al., "A gain–flattened two–stage EDFA for WDM optical networks with a fast link control channel", Optics Communications 153 (1998), pp. 23–26.

\* cited by examiner

Primary Examiner—Nelson Moskowitz
Assistant Examiner—Deandra M. Hughes
(74) Attorney, Agent, or Firm—Bell, Boyd & Lloyd LLC

(57) ABSTRACT

A cascadable optical amplifier arrangement having a modular base amplifier arrangement (BVA) that is constructed in single-mode technology and has at least one amplifier stage (VS1 to VS4). At least one high-power amplifier stage (HVS1) that has its own active fiber (AF) and at least one pump signal source (PSQ1, PSQ2) is connected to the at least one amplifier stage (VS4) of said base amplifier arrangement (BVA). In this way, a stepwise increase of the output power of an already existing base amplifier arrangement (BVA) can be achieved.

8 Claims, 2 Drawing Sheets

CASCADABLE OPTICAL AMPLIFIER ARRANGEMENT

BACKGROUND OF THE INVENTION

The very rapid growth in data traffic, especially in wide-area technology, requires an increase in the transmission capacity of present and future transmission systems. To that end, optical transmission systems are operated with wavelength-division multiplexing (WDM), in which optical WDM signals are transmitted in individual channels, or WDM channels. This technology now constitutes the preferred solution for implementing the required transmission-capacity increases.

For the error-free transmission of WDM signals, it is necessary for the reception unit of the optical transmission system to have channel levels, or WDM channel levels, with a constant value, so that as the WDM channel number increases, especially when a plurality of WDM signals are being transmitted, the total power to be transmitted in the optical fiber increases. Raising the total power in the optical fiber, however, requires optical amplifier arrangements that have high output powers. Besides the high output power, it is necessary, especially for an optical amplifier arrangement, to have a flat gain spectrum over a wide wavelength range. Inline amplifier arrangements, in particular, require low-noise production of the necessary amplification power and compensation for the dynamic gain tilt, with the aid of which it is possible to compensate for different path attenuations.

It is further necessary for such optical inline amplifier arrangements to have an intermediate pick-off for inserting dispersion compensation units or optical filters to branch off or insert optical WDM signals, or WDM channels.

To produce such optical amplifiers, or amplifier arrangements, that have high output powers, essentially three approaches are to date known, or have been proposed. One of the approaches is based on the conventional single-mode technique. The requisite high pump powers of the optical amplifier are provided by coupling together the output signal from a plurality of pump laser diodes having single-mode fiber outputs, the pump wavelengths being in the wavelength range around 1480 nm. Polarization couplers and band-separating filters, or wavelength-selective multiplexers, are used as the coupling elements in this case. The pump power generated in this way is injected into the active fiber, for example an erbium-doped optical fiber, via a wavelength-selective multiplexer. See Y. Tasiro et al. "1.5 W Erbium Doped Fiber Amplifier Pumped by the Wavelength Division-Multiplexed 1480 nm Laser Diodes with Fiber Bragg Grating", Technical Digest of the Conference on Optical Amplifiers and their Applications (1998), WC2-1, pages 213 to 215.

A further approach involves generating the high pump power with the aid of a Raman pump laser. See G. R. Jacobotic-Weselka et al.: "A 5.5-W Single-Stage-Single-Pumped Erbium-Doped Fiber Amplifier at 1550 nm", Technical Digest of the Conference on Optical Amplifiers and their Applications (1997), PD3, pages 1–4. In this case, individual semiconductor laser diodes or linear diode arrays in the wavelength window around 900 nm, with the aid of which high output powers can be generated cost-effectively, are used as primary radiation sources. Their output signal is not injected into a single-mode fiber, but rather fed in free-beam fashion or via a multimode fiber into the inner cladding of a special active optical fiber having a double cladding. The inner cladding guides the pump radiation in multimode fashion, and therefore permits simple and efficient injection of the pump radiation. The core of the active optical fiber is doped with dopant ions. These absorb the pump radiation and emit at longer wavelengths, typically around 1060 or 1100 nm, so that optical signals in this wavelength range experience amplification. In this case, laser oscillations at the emission wavelengths are generated with the aid of a resonator. Since the active fiber guides the emission radiation in a single-mode fashion, it can be processed further in single-mode fiber technology. Raman cascade lasers are used for converting the pump radiation into the wavelength ranges needed for pumping the optical amplifier arrangement.

The described multimode technique can be used for directly pumping the active optical fiber of an optical amplifier. In such an embodiment, the active fiber of the optical amplifier itself has an inner cladding, which guides the pump radiation in multimode fashion and permits simple injection of the pump radiation. Besides the dopant ions needed for the amplification process, there are further ions in the core. Their purpose is to absorb the pump radiation and forward it to the amplifier ions by non-radiative transfer processes.

An aspect common to the described embodiments of optical amplifiers with high output power is that they have to date been suitable essentially for the construction of complete booster amplifiers. Such booster amplifiers have total input powers around 0 dBm and a total output power of from approximately 27 dBm to over 33 dBm.

A method, and an amplifier arrangement, for stepwise upgrading of the output power of optical amplifiers is furthermore known, in which an amplifier arrangement, produced in conventional single-mode technology and having non-equipped pump inputs, as well as additional external pump sources are provided. In this approach, the stepwise upgradeable optical amplifier arrangement internally has all the components needed for normal operation, i.e. a long active fiber, pump-WDM couplers etc., although further external pump lasers or pump sources may be connected to the existing pump inputs for increasing the output power of the amplifier arrangement. In the case of low channel numbers, or few WDM signals to be transmitted, the requisite output power is generated by the optical amplifier arrangement without connecting in additional external pump sources. A rise in the output power of the optical amplifier arrangement, needed for example to double the WDM channel number, is possible by injecting externally generated pump radiation, or pump signals, into the active fiber via the pump inputs, or via the outwardly routed input branches of the pump-WDM coupler that is already present internally.

When optical transmission systems, or optical transmission paths, are first commissioned, it is customary not to utilize the full channel number, or WDM channel number, i.e. only a few optical WDM signals, or WDM channels are initially transmitted via the optical transmission path. It should therefore be possible for optical amplifier arrangements to be modularly upgradeable in terms of their output power, and hence permit a stepwise increase in the optical WDM channel number. If the channel number, or the number of optical WDM signals, is still low when the optical transmission path is first operated, then cost-effective optical amplifier arrangements can be used. When the demand for transmission capacity increases, i.e. the WDM channel number increases, it is necessary for the optical amplifier arrangement to be uprated cost-effectively in stages, in order to deliver the output powers respectively needed for the higher channel number.

SUMMARY OF THE INVENTION

An advantage of the invention is to provide a cascadable optical amplifier arrangement which permits a stepwise increase of the output power of a base amplifier arrangement that is constructed modularly and in single-mode technology.

In an embodiment, a cascadable optical amplifier arrangement is provided having a modular base amplifier arrangement (BVA) that is constructed in single-mode technology and has at least one amplifier stage (VS1 to VS4), and having a high-power amplifier stage (HVS1) that can be connected to the at least one amplifier stage (VS4) of the base amplifier arrangement (BVA) and has its own active fiber (AF) and at least one pump signal source (PSQ1, PSQ2).

An advantage of the cascadable optical amplifier arrangement according to the invention is that a base amplifier arrangement, which is constructed modularly and in single-mode technology, and has at least one amplifier stage, is provided with at least one high-power amplifier stage that can be connected to the at least one amplifier stage of the base amplifier arrangement and has its own active fiber as well as at least one pump signal source. The cascadable optical amplifier arrangement according to the invention, for power upgrading with at least one additional high-power amplifier stage, has the particular advantage over the known design with external pump sources that upgrading can be carried out in a plurality of stages, so that the currently and most cost-effectively implementable amplifier technology available can be used to produce a further high-power amplifier stage. By virtue of this, it is possible to use technologies for high output power that were not yet available when the base amplifier was commissioned. The base amplifier arrangement has the output power needed when the optical transmission path is constructed, as well as the amplifier components needed to produce this, which permits very cost-effective technical implementation of the base amplifier arrangement. For example, a network customer does not need to pay for the additional output power of the cascadable optical amplifier arrangement until a subsequent upgrade with the high-power amplifier stages according to the invention.

The cascadable optical amplifier arrangement according to the invention further makes it possible to retrofit optical transmission systems which were not originally intended for upgrading in terms of optical output power, or whose optical amplifiers have no facility for increasing the output power.

Advantageously, at least one further high-power amplifier stage (HVS2) can be connected to the high-power amplifier stage connected to the base amplifier arrangement. If such high-power amplifier stages are cascaded according to the invention, it is possible to increase the output power of the optical amplifier arrangement stepwise. The serially connected high-power amplifier stages have a comparatively low gain, which leads to a relatively simple technical structure. Because of said low gain, optical isolators need be used in the respective high-power amplifier stages only in exceptional cases, in particular if the existing base amplifier arrangement already has an optical isolator at its output.

Further, it is particularly advantageous if the high-power amplifier stages each have their own amplification control and/or power control, which may be produced both optoelectronically and purely optically. With the aid of the amplification control and/or power control, the serially connected, or cascaded, high-power amplifier stages can be matched to the requirements of the respective application site within the optical transmission network.

It is particularly advantageous if a filter serially connected upstream of the active fiber of the high-power amplifier stages is provided in order to level the gain spectrum of the optical signal to be amplified. The additional optical filter units needed for flattening the gain spectrum can be produced simply and cost-effectively, since they do not need to meet any special technical requirements. A flat gain spectrum of the high-power stage according to the invention can additionally be achieved by optimizing the amplifier properties, or the active fiber, of the high-power amplifier stages.

Additional features and advantages of the present invention are described in, and will be apparent from, the following Detailed Description of the Invention and the figures.

DETAILED DESCRIPTION OF THE INVENTION

Figure 1:
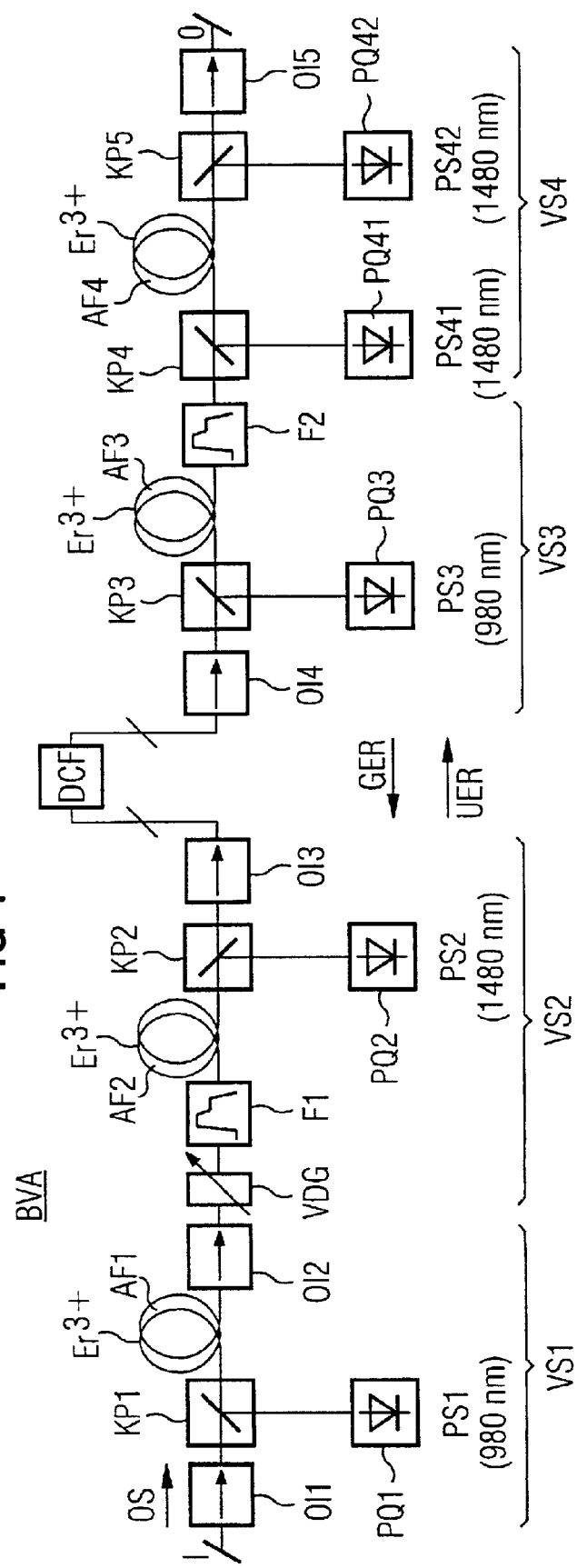
FIG. 1 is a schematic diagram of a base amplifier arrangement according to the present invention.

FIG. 1 represents, by way of example, a base amplifier arrangement BVA that is produced in single-mode technology and has a first low-noise amplifier stage VS1, a second amplifier stage VS2, a third amplifier stage VS3 and a fourth amplifier stage VS4, a variably settable attenuator VDG being provided to compensate for the dynamic gain tilt and a dispersion compensation unit DCF being provided for dispersion compensation. The base amplifier arrangement BVA has an input I and an output O, the input I also being the input of the first low-noise amplifier stage VS1. The first amplifier stage VS1 has a first optical isolator OI1, a first injection point KP1, a first active fiber AF1 and a second optical isolator OI2. The first optical isolator OI1 is connected to the input I of the optical base amplifier arrangement BVA, and its output is connected to the input of the first injection point KP1. The input of the first active fiber AF1, for example an erbium-doped fiber, is connected to the output of the first injection point. The first pump source PQ1 is connected to the injection input of the first injection point KP1. Further, the second optical isolator OI2 is routed to the output of the first active fiber AF1. The variably settable attenuator VDG intended to compensate for the dynamic gain tilt is arranged following the first amplifier stage VS1. The second amplifier stage VS2 follows the variable attenuator VDG.

The second amplifier stage VS2 has a first optical filter F1, a second active fiber AF2, preferably with an erbium-doped active fiber, a second injection point KP2, a second pump source PQ2 and a third optical isolator OI3. The first filter F1 is arranged following the variable attenuator VDG, and is used for leveling the signal spectrum of the optical signal OS to be transmitted. The second active fiber AF2 is connected to the output of the first optical filter F1, and the input of the second injection point KP2 is in turn routed to the output of said second active fiber AF2. The output of the second injection point KP2 is connected to the input of the third optical isolator OI3. Further, the second pump source PQ2 is connected to the injection input of the second injection point KP2.

In the exemplary embodiment that is represented, the dispersion compensation unit DCF is, for example, inter-connected between the second amplifier stage VS2 and the third amplifier stage VS3. Additional dispersion compensation units DCF can also be provided, for example, between further amplifier stages VS1 to VS4.

The third amplifier stage VS3 has a fourth optical isolator OI4, a third injection point KP3, a third pump source PQ3, a third active fiber AF3 and a second optical filter F2. In the optical base amplifier BVA that is represented in FIG. 1, the third amplifier stage VS3 is connected directly to the dispersion compensation unit DCF, the fourth optical isolator 014 here being routed to the output of the dispersion compensation unit DCF. The output of the fourth optical isolator OI4 is connected to the third injection point KP3. The output of the third injection point KP3 is connected to the input of the third active fiber AF3, and the injection input of the third injection point KP3 is connected to the third pump source PQ3. The output of the third active fiber AF3 is routed to the input of the second optical filter F2. The fourth amplifier stage VS4, which has a fourth injection point KP4, a fourth active fiber AF4 and a fifth injection point KP5 as well as a fifth optical isolator OI5 and a fourth and fifth pump source PQ41, PQ42, is connected to the output of the second optical filter F2. The input of the fourth injection point KP4 is connected to the output of the second optical filter F2 of the third amplifier stage VS3. The input of the fourth active fiber AF4 is connected to the output of the fourth injection point KP4, and the output of said fourth active fiber AF4 is routed to the input of the fifth injection point KP5. The injection input of the fourth injection point KP4 is connected to the fourth pump source PQ41. Further, the injection input of the fifth injection point KP5 is connected to the fifth pump source PQ42. The input of the fifth optical isolator OI5 is connected to the output of the fifth injection point KP5, and its output is routed to the output O of the optical base amplifier arrangement BVA.

The base amplifier arrangement BVA that is represented in FIG. 1 constitutes one of many possible configurations of very different base amplifier arrangements BVA; booster amplifiers, preamplifiers and inline amplifiers may in particular have slightly different configurations. For example, further amplifier stages VS1 to VS4 may be added, or amplifier stages may be omitted. The base amplifier BVA that is represented in FIG. 1 has an output power of about 20 dBm.

The optical signal OS to be amplified is routed to the input I of the optical base amplifier arrangement BVA, and low-noise preamplification is carried out with the aid of the first amplifier stage VS1. In this case, the first pump source PQ1 is used to generate a first pump signal PS1 having, for example, a wavelength of 980 nm which is injected into the first active fiber AF1 via the first injection point KP1. The optical signal OS experiences optical amplification because of the injected first optical pump signal PS1 in the first active fiber AF1, and, following from the first active fiber AF1, it is transmitted via the second optical isolator OI2 to the variably settable attenuator VDG.

Compensation for the dynamic gain tilt of the optical signal OS is carried out with the aid of the variably settable attenuator VDG, and, following from this, the first optical filter F1 that is provided in the second amplifier stage VS2 levels the optical spectrum of the optical signal OS1. The transmission of the optical signal OS is carried out in a transmission direction OER. The second amplifier stage VS2, in contrast to the first amplifier stage VS1, is pumped in a reverse transmission direction GER, i.e. the second pump signal PS2 generated in the second pump source PQ2 is injected via the second injection point KP2 in the reverse transmission direction GER into the second active fiber AF2. The second optical pump signal PS2, for example having a wavelength of 1480 nm, hence propagates from the output of the second active fiber AF2 in the reverse transmission direction GER to the input of the second active fiber AF2. The optical signal OS present at the output of the first optical filter F1 is injected into the second active fiber AF2, and it experiences further preamplification with the aid of the second pump signal PS2 in the second active fiber AF2. After the second active fiber AF2, the optical signal OS is transmitted via the third optical isolator OI3 to the input of the dispersion compensation unit DCF, in which dispersion compensation is carried out.

Following from the dispersion compensation, the optical signal OS is injected into the third amplifier stage VS3, where the optical signal OS passes through the fourth optical isolator OI4 and is injected via the third injection point KP3 into the third active fiber AF3. The third active fiber AF3 is pumped in the transmission direction UER by a third pump signal PS3 that is generated by the third pump source PQ3 and has, for example, a wavelength of 980 nm. To that end, the third pump signal PS3 generated in the third pump source PQ3 is injected in the transmission direction UER via the third injection point KP3 into the third active fiber AF3. At the output of the third active fiber AF3, the optical signal OS that has been additionally amplified with the aid of the third pump signal PS3 is routed to the input of the second optical filter F2. With the aid of the second optical filter F2, further leveling of the spectrum of the optical signal OS is carried out.

Following from the third amplifier stage VS3, the optical signal OS is subjected to a final amplification with the aid of the fourth amplifier stage VS4. The fourth amplifier stage VS4 has a fourth and fifth pump source PQ41, PQ42, the fourth active fiber AF4 being pumped in the transmission direction UER with the aid of the fourth pump source PQ41 and in the reverse transmission direction GER with the aid of the fifth pump source PQ42. In the fourth active fiber AF4, the optical signal OS that has been injected via the fourth optical injection point KP4 into the fourth active fiber AF4 experiences additional amplification by the fourth optical pump signal PS41 generated in the fourth pump source PQ41 and via the fifth pump signal PS42 generated in the fifth pump source PQ42. In the exemplary embodiment that is represented, the fourth and the fifth pump signals PS41, PQ42 have, for example, the same pump wavelength of 1480 nm. The optical signal OS amplified in this way is transmitted via the fifth injection point KP5 and the fifth optical isolator OI5 to the output O of the optical base amplifier arrangement BVA.

Figure 2:
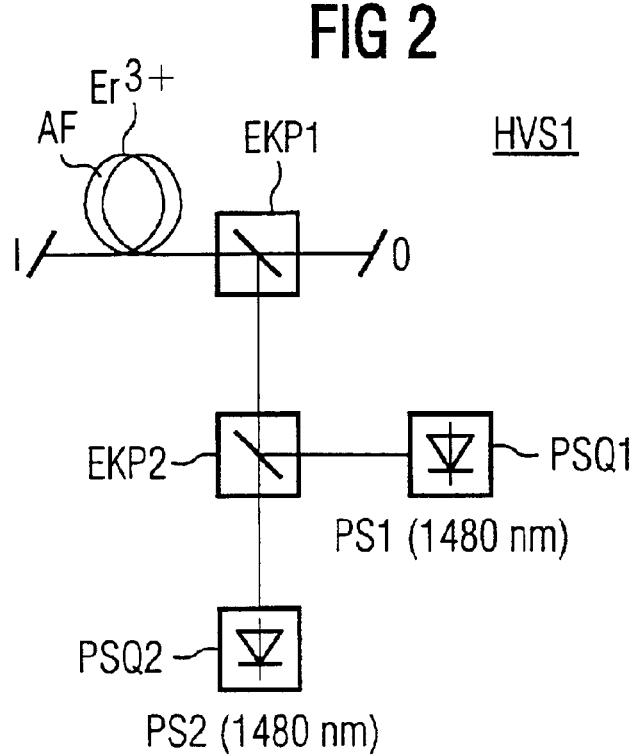
FIG. 2 is a schematic diagram of an embodiment of a first high-power amplifier stage.

To raise the output power of the base amplifier BVA that is represented in FIG. 1, according to the invention a first high-power amplifier stage HVS1 that is represented in FIG. 2 is utilized. For example, the input I of the first high-power amplifier stage HVS1 is connected to the output O of the base amplifier arrangement BVA.

FIG. 2 represents a possible embodiment of the first high-power amplifier stage HVS1, which has an active fiber AF, a first injection point EKP1, a second injection point EKP2, a first pump signal source PSQ1 and a second pump signal source PSQ2. The input of the active fiber AF1 is routed to the input I of the first high-power amplifier stage HVS1, and its output is connected to the input of the first injection point EKP1. The active fiber AF may, for example, be produced with the aid of an erbium-doped fiber.

For doping the active fibers AF with ions of rare earth elements, the following elements inter alia will be used in practice, the differently doped active fibers AF being operated in different wavelength ranges:

| | | |
|---|---|---|
| $Er^{3+}$ | 1530–1560 nm | (erbium) |
| $Pr^{3+}$ | 1280–1310 nm | (praseodymium) |
| $Nd^{3+}$ | 1340–1370 nm | (neodymium) |
| $Tm^{3+}$ | 1450–1480 nm | (thulium) |
| $Yb^{3+}$ | 1080–1110 nm | (ytterbium) |

The doping of the active fibers AF that are intended for constructing the optical high-power stage HVS1 according to the invention may be carried out with any ions of elements from the rare earth group or other laser-active ions, an advantageous configuration of the optical high-power stage HVS1 according to the invention being obtained, in particular, when an $Er^{3+}$-doped active fiber AF is used.

The output of the first injection point EKP1 of the high-power amplifier stage HVS1 that is represented in FIG. 2 is connected to the output O of the first high-power amplifier stage HVS1. Further, the first pump signal source PSQ1 and the second pump signal source PSQ2 are connected via the second injection point EKP2 to the first injection point EKP1. To produce the output power of the first high-power amplifier stage HVS1 that is needed for the high-power amplification, a first and a second pump signal PS1, PS2 are generated in the first and in the second pump signal sources PSQ1, PSQ2 and are fed via the second injection point EKP2 and via the first injection point EKP1 into the active fiber AF in the reverse transmission direction GER. The optical signal OS that has been injected into the active fiber AF of the first high-power stage HVS1 is amplified with the aid of the first and second pump signals PS1, PS2 generated in the first and second pump signal sources PSQ1, PSQ2, and is transmitted via the first injection point EKP1 to the output O of the first high-power stage HVS1.

If the first high-power amplifier stage HVS1 is connected, according to the invention, to the base amplifier arrangement BVA, it is possible to raise or increase the output power of the base amplifier arrangement BVA by a further 3 dB, i.e. to 23 dBm overall. In the second upgrading step, or cascading step, a second high-power amplifier stage HVS2 is additionally connected to the output O of the first high-power amplifier stage HVS1, by means of which the overall cascading optical amplifier arrangement—base amplifier arrangement BVA+first high-power amplifier stage HVS1+second high-power amplifier stage HVS2—is upgraded to a total output power of 27 dBm.

Figure 3:
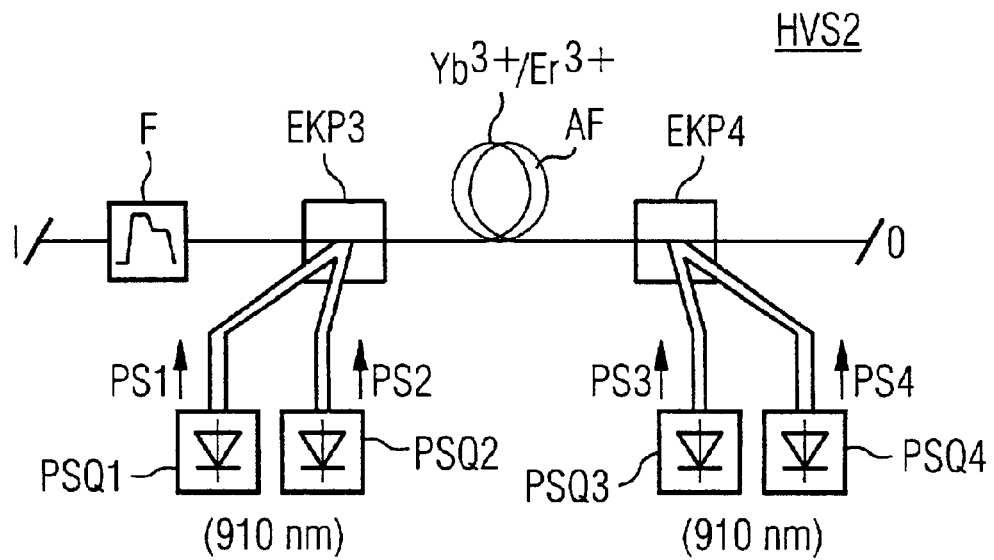
FIG. 3 is a schematic diagram of an embodiment of a second high-power amplifier stage.

Such a second high-power amplifier stage HVS2 is represented by way of example in FIG. 3. In this case, the second high-power amplifier stage HVS2 has, in particular, an optical filter F, a first, second, third and fourth pump signal source PSQ1 to PSQ4 as well as a third injection point EKP3, an active fiber AF and a fourth injection point EKP4. The input I of the second high-power amplifier stage HVS2 is followed by the optical filter F for leveling the spectrum of the optical signal OS. The input of the third injection point EKP3 is connected to the output of the optical filter F, and its output is routed to the input of the active fiber AF, for example an $Er^{3+}$-$Yb^{3+}$co-doped active fiber. Further, the first and second pump signal sources PSQ1, PSQ2 are connected to the injection inputs of the third injection point EKP3. The input of the fourth injection point EKP4 is connected to the output of the active fiber AF, and its output is connected to the output O of the second high-power amplifier stage HVS2. In a similar way as for the third injection point EKP3, a third and fourth pump signal source PSQ3, PSQ4 are also connected to the injection inputs of the fourth injection point EKP4.

The optical signal OS that has been processed with the aid of the optical filter F is injected via the third injection point EKP3 into the active fiber of the second high-power amplifier stage HVS2, and is amplified in the active fiber AF. To that end, a first and second pump signal PS1, PS2 are generated in the first and second pump signal sources PSQ1, PSQ2 and are injected via the third injection point EKP3 in the transmission direction UER into the active fiber AF. In addition, a third and a fourth pump signal PS3, PS4 are generated in the third and fourth pump signal sources PSQ3, PSQ4 and are injected via the fourth injection point EKP4 in the reverse transmission direction GER into the active fiber AF. After leaving the active fiber AF, the optical signal OS amplified in this way is transmitted via the fourth injection point EKP4 to the output O of the second high-power amplifier stage HVS2.

The serially connected first and second high-power amplifier stages HVS1, HVS2 have a low gain, each approximately 3 dB in the exemplary embodiment that is represented, which leads to a very simple technical structure. Because of the low gain, optical isolators OI need be used only in exceptional cases in the high-power amplifier stages HVS1, HVS2. Further, the optical filter F needed for leveling the gain spectrum need only satisfy minor sharpness requirements, for which reason such filters can be produced particularly simply and cost-effectively.

It is expedient if the serially connected first and second high-power amplifier stages HVS1, HVS2 each have their own power or amplification control—not shown in FIGS. 1 to 3—which may for example be produced as a combination of total output power control and fast gain control. The gain control may be produced both optoelectronically and purely optically. The proposed design of a cascadable optical amplifier arrangement is suitable for increasing the output power of various amplifier types, for example booster, pre- and inline amplifier types. In the case of amplifier types which have one or more intermediate pick-offs, for example inline amplifiers, the proposed design may additionally be used at the output of one or more intermediate pick-offs, i.e. one or more high-power amplifiers HVS1, HVS2 will already be connected serially after the output, for example, of an intermediate pick-off.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A cascadable optical amplifier arrangement, comprising:
   a modular base amplifier arrangement constructed in single-mode technology and having at least a first amplifier stage and a second amplifier stage; and
   a high-power amplifier stage connected to the second amplifier stage of the base amplifier arrangement, wherein the high-power amplifier state includes an active fiber, at least two pump signal sources, and at least one of an amplification control and a power control.

2. The cascadable optical amplifier arrangement as claimed in claim 1, further comprising at least one further high-power amplifier stage having an active fiber and at least two pump signal sources, wherein the at least one further high-power amplifier state is connected to the high-power amplifier stage that is connected to the base amplifier arrangement.

3. The cascadable optical amplifier arrangement as claimed in claim 2, wherein the at least one further high-power amplifier stage respectively includes at least one of an amplification control and a power control.

4. The cascadable optical amplifier arrangement as claimed in claim 3, wherein the at least one of an amplification control and a power control for each of the high-power amplifier stage and the further high-power stage is produced in a manner which is one of optoelectronically and purely optically.

5. The cascadable optical amplifier arrangement as claimed in claim 1, wherein the at least one of an amplification control and a power control is produced in a manner which is one of optoelectronically and purely optically.

6. The cascadable optical amplifier arrangement as claimed in claim 2, wherein the at least two pump signal sources for pumping the active fibers of the high-power amplifier stages are connected to inputs and to outputs of the respective active fibers.

7. The cascadable optical amplifier arrangement as claimed in claim 2, further comprising a filter, serially connected upstream of the active fibers of the high-power amplifier stages, for leveling a gain spectrum of an optical signal to be amplified.

8. The cascadable optical amplifier arrangement as claimed in claim 1, further comprising a filter, serially connected upstream of the active fiber of the high-power amplifier stage, for leveling a gain spectrum of an optical signal to be amplified.

\* \* \* \* \*